United States Patent Office 2,783,130
Patented Feb. 26, 1957

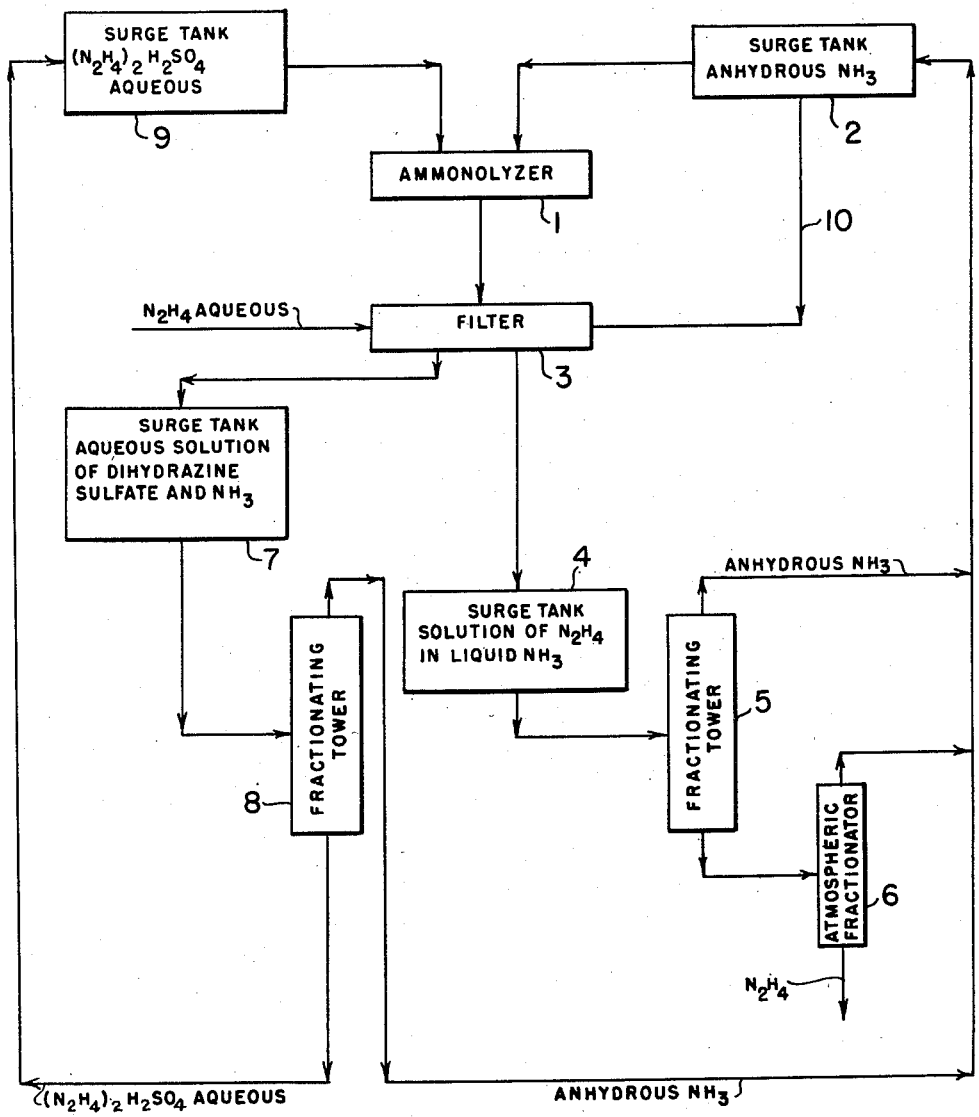

2,783,130

PROCESS FOR THE PRODUCTION OF HYDRAZINE

Bernard H. Nicolaisen, Kenmore, N. Y., assignor to Olin Mathieson Chemical Corporation, a corporation of Virginia Application June 4, 1954, Serial No. 434,522

1 Claim. (Cl. 23—190)

My invention relates to improvements in a process for the production of anhydrous hydrazine by the ammonolysis of dihydrazine sulfate. My invention is particularly directed to a method for the recovery and use of the valuable ammonia and sulfate content of by-product ammonium sulfate formed in the production of anhydrous hydrazine by the ammonolysis of dihydrazine sulfate.

Prior art methods for the preparation of hydrazine, for the most part, produce dilute aqueous solutions of the hydrazine from which recovery of anhydrous hydrazine by distillation is complicated by the formation of an azeotrope containing approximately equal molar proportions of hydrazine and water. The azeotrope produced has previously been dehydrated by means of caustic soda, barium oxide or the like to give the desired product, anhydrous hydrazine.

Attempts have also been made to prepare anhydrous hydrazine by the reaction of ammonia with hydrazine sulfate. This reaction is highly exothermic and although partially successful on a small scale is unsatisfactory commercially since the heat liberated is so great that decomposition, or at best, sintering of the hydrazine sulfate to a sticky mass, results.

An improved commercially feasible process for the production of anhydrous hydrazine has been disclosed in copending application Serial No. 99,583 filed June 16, 1949, by Maurice C. Taylor, now U. S. Patent 2,680,672, issued June 8, 1954. The process proposed by Taylor comprises reacting anhydrous dihydrazine sulfate with ammonia while maintaining a substantial part of the dihydrazine sulfate in the liquid phase during the course of the reaction. The ammonolysis can be carried out at a temperature of at least about 40° C.±3° C. The resultant reaction mixture is a suspension, the solid phase comprising ammonium sulfate, a by-product of the ammonolysis, and the liquid phase comprising a solution of hydrazine in ammonia. The solid phase of the suspension is removed by filtration. Distillation of the filtrate recovers ammonia and leaves the desired product, anhydrous hydrazine.

This process obviates the difficulty of separating water from hydrazine by employing a material, aqueous dihydrazine sulfate, which can be readily dehydrated by simple evaporation. In the operation of Taylor's process aqueous dihydrazine sulfate may be charged to the vessel in which the ammonolysis is to be carried out and then dehydrated by applying heat and vacuum. The temperature and degree of vacuum are advantageously increased as the dehydration proceeds so that when all of the water is removed, a substantial part of the dihydrazine sulfate will be in the fused state. Alternatively, anhydrous dihydrazine sulfate can be maintained in the liquid phase, the condition most favorable for ammonolysis, by solution in hydrazine. The ammonolysis operation is then carried out in the same vessel in which the fusion of the dihydrazine sulfate was accomplished. It is preferred to initiate the reaction with gaseous ammonia and to complete the ammonolysis with liquid ammonia. The reaction mixture is then filtered and distilled to give a filter cake of ammonium sulfate, ammonia which can be recycled to the ammonolysis operation, and the product anhydrous hydrazine.

The process proposed by Taylor is, therefore, more efficient and economical than the methods of the prior art in that it produces substantially quantitative yields of anhydrous hydrazine directly by distillation of the reaction mixture and also allows for the recovery of substantial amounts of the excess ammonia charged. Some ammonia as well as all of the sulfate content of the dihydrazine sulfate is lost in the process, however, as by-product ammonium sulfate. My present invention is an improvement in Taylor's process in that it provides a method for the recovery and reuse in the preparation of anhydrous hydrazine of the ammonia and sulfate content of the previously discarded by-product ammonium sulfate. The advantages of my improved process are obvious; none of the reactants need be permanently removed from the reaction zone except as the desired product anhydrous hydrazine.

My invention comprises the steps of treating an ammonium sulfate filter cake, obtained by filtering a reaction mixture from the ammonolysis of dihydrazine sulfate, with an aqueous solution of hydrazine. The treatment is continued until all of the ammonium sulfate has dissolved to form an aqueous solution containing dihydrazine sulfate and ammonia. Ammonia and anhydrous dihydrazine sulfate are recovered from the above solution and recycled to the ammonolysis operation to form more anhydrous hydrazine. The reactants for the production of anhydrous hydrazine are recovered from the above solution by a simple distillation. Anhydrous ammonia can be recovered overhead and aqueous dihydrazine sulfate as a bottom product. The aqueous solution of dihydrazine sulfate can be evaporated to give the anhydrous salt and charged to the ammonolyzer. Alternatively, the aqueous solution of dihydrazine sulfate can be charged to the ammonolyzer directly and evaporated to dryness and fused therein prior to ammonolysis. My new process, therefore, returns the entire ammonia and sulfate content of the by-product ammonium sulfate to the ammonolysis operation as reactants to produce anhydrous hydrazine.

My invention will be further illustrated by reference to the drawing which shows a diagrammatic flow sheet of a process for the production of anhydrous hydrazine by the ammonolysis of dihydrazine sulfate which embodies the improvement of this invention.

Fused anhydrous dihydrazine sulfate contained in the ammonolyzer 1 is treated with anhydrous gaseous ammonia from surge tank 2 while maintaining the contents of the ammonolyzer at least partially in the liquid phase. When sufficient gaseous ammonia has been introduced to form liquid hydrazine in the mixture, the temperature of the reaction mixture may be gradually reduced as more ammonia is introduced. When the reaction is substantially complete, a large excess of anhydrous liquid ammonia is charged to the ammonolyzer to complete the reaction. The reaction mixture at this point comprises a dilute solution of hydrazine in anhydrous liquid ammonia containing suspended solid ammonium sulfate. The contents of the ammonolyzer are charged to the filter 3. The filtrate, comprising hydrazine in ammonia is charged through surge tank 4 to fractionating column 5 under superatmospheric pressure. Anhydrous ammonia is removed overhead and recycled to surge tank 2 for reuse in the ammonolyzer 1. Anhydrous hydrazine containing some ammonia, obtained as a bottoms product from fractionating column 5, is fed to an atmospheric fractionator 6 in which the residual ammonia is removed, leaving the product anhydrous hydrazine.

The ammonium sulfate filter cake in filter 3 is now treated by the process of my invention. The filter cake is washed in the filter 3 with anhydrous liquid ammonia from line 10 to remove adsorbed hydrazine, and the washings are added to the main filtrate. The washed filter cake is then treated by the introduction of dilute aqueous hydrazine. When the filter cake has dissolved, the aqueous solution containing dihydrazine sulfate and ammonia is charged to fractionating tower 8 through surge tank 7. The fractionating tower 8 is operated under superatmospheric pressure in order to obtain anhydrous ammonia overhead. The ammonia is condensed to a liquid and recycled to surge tank 2 for reuse in ammonolyzer 1. The bottoms product from column 8 comprising a solution of dihydrazine sulfate in water is fed to surge tank 9. The contents of surge tank 9 may be evaporated to dryness and the resultant anhydrous dihydrazine sulfate charged to ammonolyzer 1 or the aqueous solution from surge tank 9 may be charged directly to the ammonolyzer and dehydrated and fused therein.

Aqueous solutions containing from about 2 to 60% hydrazine by weight are suitable for treatment of the ammonium sulfate filter cake. I have found that a solution containing about 11% hydrazine is particularly suitable. The holding time required for complete solution of a filter cake, depends on several factors including the amount, temperature and concentration of the hydrazine solution used. Advantageously the proportion of hydrazine to ammonium sulfate does not exceed the stoichiometric requirement of 2:1. All of the hydrazine is then combined as dihydrazine sulfate, and when the solution is subsequently evaporated, for example, as described in the Taylor process, no free hydrazine is lost with the aqueous vapors. In the process of the present invention, an excess over the stoichiometric ratio of hydrazine to ammonium sulfate may be used, however, provided adequate means are introduced for the recovery of excess hydrazine in the aqueous overhead from the evaporator. For example, such dilute aqueous hydrazine may be charged to an absorber in which an acid liquor is used as scrubbing liquid or it may be charged to an atmospheric fractionator for the recovery of hydrazine hydrate from more dilute aqueous hydrazine or to the tower producing the 11% hydrazine solution used initially for treating the ammonium sulfate. I have found that good results and reasonable holding times can be achieved by using the stoichiometric proportions of 64 parts by weight of hydrazine (e. g. 640 parts of 10% aqueous hydrazine) for each 132 parts of ammonium sulfate filter cake when the temperature of the solution is in the preferred range of about 20 to 100° C. Solution occurs more rapidly at the higher temperatures of the range, but temperatures above 100° C. are not usually desirable since the vapor pressure of ammonia becomes excessive requiring heavy equipment to prevent loss of ammonia. On the other hand, employing hydrazine solutions at temperatures less than 20° C. usually requires an inconveniently long hold-up time for complete solution of the ammonium sulfate. Any suitable means of contacting the filter cake can be employed, e. g., the dilute aqueous hydrazine may be continuously pumped through the filter at a controlled rate providing adequate contact time or the filter cake can be contacted batchwise with aqueous hydrazine.

Heat required in the fractionating operations may be supplied from any suitable source such as a reboiler. Pressures of 150 to 200 p. s. i. g. are sufficient to separate ammonia from an aqueous solution in anhydrous form, e. g., anhydrous ammonia distills overhead at about 26° C. under 150 p. s. i. g. pressure. The aqueous solutions of dihydrazine sulfate obtained usually contain about 20-25% of the salt by weight.

In a specific example of the preferred method of practicing my invention, approximately 345 parts of dihydrazine sulfate is fused by heating to a temperature of 130° C. in a pressure vessel fitted with an agitator under a vacuum of about 30 inches of mercury. Ammonia vapor is then charged to the vessel at a gauge pressure of 275 pounds per square inch. As the reaction proceeds, hydrazine is formed and the temperature is gradually reduced to about 56° C. by passing cooling water through a jacket surrounding the reactor. Additional ammonia is supplied to the reactor to maintain the above-indicated pressure as rapidly as the ammonia is absorbed by the liquid. A total of about 100 parts of ammonia vapor is thus added. Thereafter, addition of ammonia vapor is discontinued and liquid ammonia (wash liquor from the previous operation) containing in all about 28 parts of hydrazine, together with sufficient fresh ammonia to make a total of about 800 parts is then added to the pressure vessel with continued cooling to bring the temperature down to about 50° C. Thereafter, the solution is filtered under its own vapor pressure and the filter cake is washed with 890 parts of additional fresh ammonia. The original filtrate and wash filtrate are separately collected and the latter set aside for use in the succeeding operation. Upon evaporation of the ammonia, the original filtrate yields about 138 parts of a liquid, which is about 95.8% hydrazine or the equivalent of about 96% of the theoretical possible yield of anhydrous hydrazine based on the dihydrazine sulfate.

Having obtained an ammonium sulfate filter cake by the above procedure, the process of my invention is carried out as follows. Approximately 100 parts by weight of ammonium sulfate filter cake is treated with 430 parts of an aqueous solution containing 11% hydrazine by weight. The solution at 100° C. is charged to the filter and allowed to remain in contact with the ammonium sulfate until solution is complete. The resulting solution containing dihydrazine sulfate and dissolved ammonia is charged to a fractionating tower and distilled under a pressure of about 200 p. s. i. g. anhydrous ammonia is removed overhead and recycled to the ammonolysis reaction. The still bottoms comprise an aqueous solution containing about 24% dihydrazine sulfate by weight. This solution is evaporated to dryness under vacuum to yield the anhydrous salt which is then charged to an ammonolysis operation to produce anhydrous hydrazine.

It is to be understood that the above example is for illustration only and is not to be construed as limiting the scope of my invention.

I claim:

In a process for the production of anhydrous hydrazine which comprises the ammonolysis of anhydrous dihydrazine sulfate to produce a suspension, the solid phase comprising ammonium sulfate and the liquid phase comprising a solution of hydrazine in ammonia, filtering the suspension to remove solid ammonium sulfate, distilling the filtrate to separate ammonia and anhydrous hydrazine, and recycling the ammonia to the ammonolysis operation, the improvement which comprises treating the solid ammonium sulfate with an aqueous solution of hydrazine for a time sufficient to dissolve the ammonium sulfate and produce an aqueous solution containing dihydrazine sulfate and ammonia, distilling the solution to recover ammonia and aqueous dihydrazine sulfate, recycling the recovered ammonia to the ammonolysis operation, dehydrating the dihydrazine sulfate by evaporation and employing the resultant anhydrous dihydrazine sulfate in the ammonolysis operation.

References Cited in the file of this patent

UNITED STATES PATENTS 2,680,672     Taylor _____ June 8, 1954

OTHER REFERENCES

"The Chem. of Hydrazine" by L. F. Audrieth and B. A. Ogg, 1951 ed., page 171. John Wiley and Sons, Inc., N. Y.

J. W. Mellor's: "A Comprehensive Treatise on Inorganic and Theoretical Chem.," vol. 8, 1929 ed., pages 317 and 326 Longmans, Green and Co., N. Y.